United States Patent [19]
Coquyt

[11] 3,837,110
[45] Sept. 24, 1974

[54] ANIMAL TRAP
[76] Inventor: Camiel J. Coquyt, Box 45, Ghent, Minn. 56239
[22] Filed: Dec. 6, 1973
[21] Appl. No.: 422,175

[52] U.S. Cl. ................................................. 43/87
[51] Int. Cl. ........................................ A01m 23/34
[58] Field of Search ..................................... 43/87

[56] References Cited
UNITED STATES PATENTS
| | | | |
|---|---|---|---|
| 472,733 | 4/1892 | Lewis | 43/87 |
| 1,900,219 | 3/1933 | Bailey | 43/87 |

Primary Examiner—Louis G. Mancene
Assistant Examiner—Daniel J. Leach
Attorney, Agent, or Firm—Walter N. Kirn, Jr.

[57] ABSTRACT

An animal trap having a central coil with arms extending therefrom, and a snare wire extending between the terminal portions of the arms, the snare wire having a centrally located knot therein, the knot being adapted to assume (1) an enlarged trapable configuration when the arms are urged towards each other to a loaded position and (2) a trapping configuration when the arms are permitted to relax to a sprung position, a telescoping locking mechanism for releasably holding the arms in the loaded position, and a trigger actuated by the animal to be trapped for releasing the locking mechanism.

9 Claims, 6 Drawing Figures

PATENTED SEP 24 1974  3,837,110

ANIMAL TRAP

This invention relates to an animal trap, especially an animal trap providing a snare mechanism.

While the trapping of animals is an art of long standing, there remains a need for a trap which is both effective in terms of its trapping ability and its effect on the animal. As to the latter, increasing pressure has been applied by animal protective societies to have a trap which alleviates as much as possible the pain and suffering of the trapped animal. Traps of the jaw type in which a limb of the animal is caught are especially undesirable from this standpoint as a trapped animal is seldom killed by the trap per se. Accordingly, it is left to perish from starvation, the elements, or predators unless freed from the trap in time. Very often the animal resorts to self-maiming to gain its freedom, resulting in a weakened, injured animal unable to survive. Snare-type traps have been devised which capture the animal by ensnaring the body or neck, causing death to occur relatively quickly and painlessly. But to date these traps have not proved entirely effective from a trapping standpoint due to configurational or positional limitations of the trap body and/or the snare mechanism. In some cases the trap is of a bulky, complicated design ill-suited to concealed placement in the animal's environs. Obviously, the more hardware in the trap, the greater the likelihood of detection by sight or smell. Moreover, there is an increased likelihood of disabling interference by twigs, stones, dirt and the like. Other traps, while quite simple in mechanism, are severly limited by the design. In particular, the snare loop may be constrained to a size applicable only to animals of one particular size group. Or in other cases, the loop can only be positioned within the plane of the trap body. Patents exemplifying snare-type traps include U.S. Pat. Nos. 472,733; 1,716,959; 1,860,378; and 1,900,219.

It is an object of the present invention to provide an animal trap which is readily concealable, adaptable to a variety of snare positions, capable of trapping animals of various sizes, and relatively humane in operation.

These and other objects which will be apparent hereinafter are provided in this invention by an animal trap comprising spring means having first and second arm members adapted to move from a loaded position to a sprung position in a substantially uniplanar direction, snare means operatively connected to said spring means, said snare means including a knot means adapted to assume a trapable configuration when said spring means is in said loaded position and a trapping configuration when said spring means is in said sprung position, said knot means in said trapable configuration being positionable substantially entirely beyond a line between the ends of said first and second arm members and further said knot means in said trapable configuration having a crosswise dimension with respect to the longitudinal axis of said spring means independent of the distance between the ends of said first and second arm members, locking means for releasably locking said spring means in said loaded position, said locking means comprising first means associated with said first arm and second means associated with said second arm, and latch means adapted to releasably engage said first and second means when said spring means is in said loaded position, and trip means operatively connected to said latch means, said trip means being adapted to be actuated by the animal when said snare means is in said trapable configuration whereby said latch means releases said first and second means allowing said first and second arm members to move in a substantially uniplanar direction to said sprung position.

Reference is now made to the drawings wherein.

Figure 1:
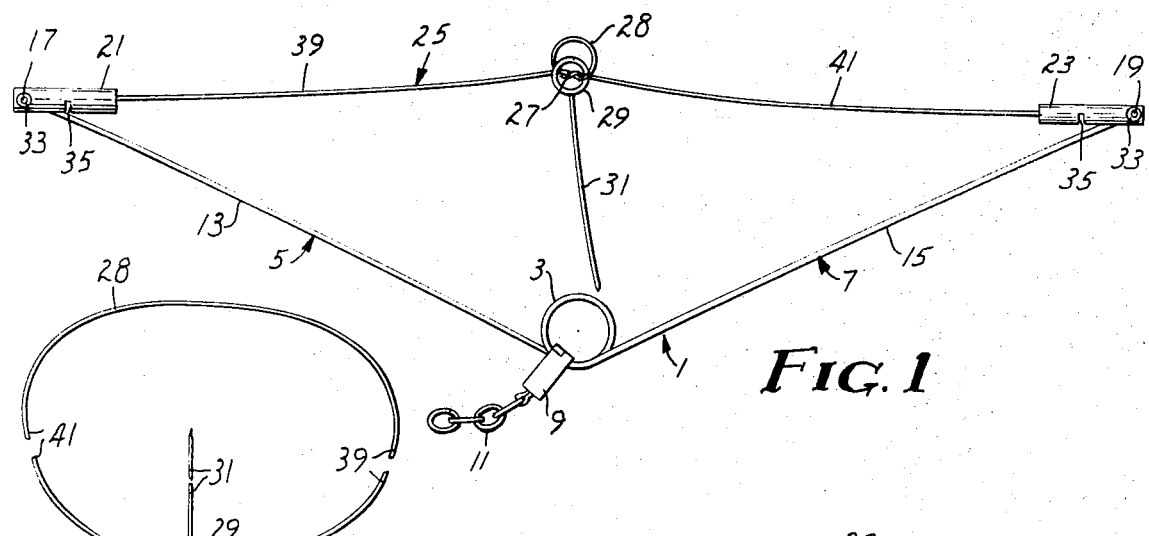
FIG. 1 is a top plan view of the trap when sprung.

In FIG. 1 the trap includes a spring 1 having a central coil 3 and arms 5 and 7 extending therefrom. Attached to coil 3 is a clip 9 to which is attached chain 11. The trap can be held to a stake, tree, or other fixture if desired by means of chain 11 which may have a terminal pressure clip if desired to permit the desired chain length to be used. Arms 5 and 7 include elongated body portions 13 and 15 and posts 17 and 19, respectively. The latter are preferably normal to the body portion.

Mounted on posts 17 and 19, respectively, are sleeves 21 and 23. Sleeves 21 and 23 are tubular in construction and each have aligned apertures through which passes the posts 17 and 19, respectively. This mode of attachment allows sleeves 21 and 23 to pivot about the posts 17 and 19, respectively. Passing longitudinally through the sleeves 21 and 23 and attached to posts 17 and 19 intermediate the ends of the posts is a cable 25 having a centrally located running knot 27 having a loop 28. Passing through knot 27 is a ring 29 having extending therefrom a trip member 31. As shown, ring 29 remains in the knot when the trap is in the sprung position. To keep sleeves 21 and 23, as well as cable 25, from slipping off the ends of posts 17 and 19, cap members 33 are provided.

Figure 5:
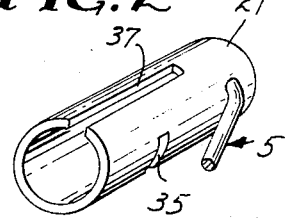
FIG. 5 is a perspective view of an element of the locking mechanism.

Sleeves 21 and 23, as best shown in FIG. 5, each include a transverse slot 35, and a longitudinal slot 37 open at the end proximal to the knot 27. Sleeves 21 and 23 are fitted on posts 17 and 19 such that transverse slots 35 face away from knot 27 and towards coil 3 whereas longitudinal slots 37 face towards knot 27 and away from coil 3.

Figure 3:
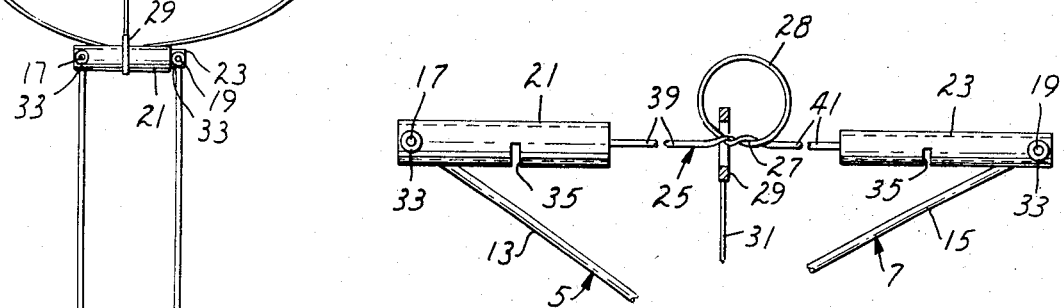
FIG. 3 is a top plan view showing details of the locking mechanism of the trap.
Figure 2:
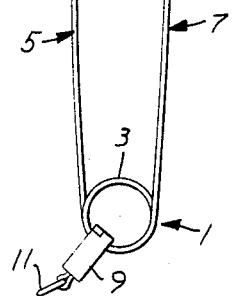
FIG. 2 is a top plan view of the trap when set or loaded.
Figure 4:
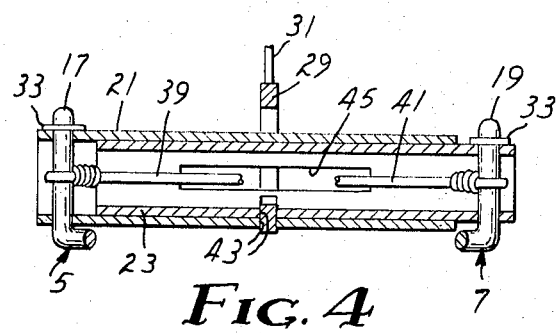
FIG. 4 is a sectional view in elevation of the locking mechanism in the locking mode.

In FIG. 2, the trap is shown in the set or loaded position. It will be noted from FIG. 3 that sleeve 21 has a larger inside diameter than sleeve 23 which enables the sleeves to be telescoped as shown in FIG. 2 and in greater detail in FIG. 4. By urging arms 5 and 7 together against the coil pressure, the length of the portions 39 and 41 of cable 25 is proportionally shortened whereas the length of the cable 25 comprising the loop 28 increases proportionally. Arms 5 and 7 assume a locking position by pushing sleeve 23 into the annular space provided by larger sleeve 21 until slots 35 and 37 associated with each sleeve are in matching relationship. Accordingly, a common transverse slot 43 and a common longitudinal slot 45 are provided. In FIG. 4, the sleeves are seen from the knot such that cable 25 is viewable in the common longitudinal slot 45.

Figure 6:
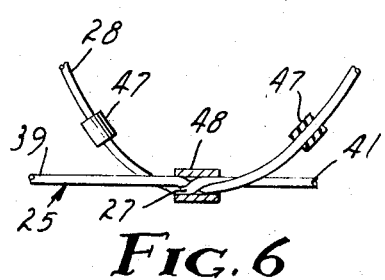
FIG. 6 is an enlarged partial plan view of an embodiment of the snare element of the invention.

When sleeves 21 and 23 are in proper telescoping position and common transverse slot 43 is formed, a segment of ring 29 is positioned in slot 43 thereby locking arms 5 and 7 and knot 27 through which ring 29 passes in this loaded configuration. Ring 29 is so positioned that trip member 31 extends substantially within the perimeter of the loop 28 which has assumed a generally circular shape. It can be seen that ring 29 may be so located in transverse slot 43 that trip member 31 can assume any variation of setting in a complete circle with respect to a line between the ends of arms 5 and 7. Shown in FIG. 6 attached at positions on loop 28 on either side of the junction of knot 27 are stop members 47 and knot piece 48. By means of these stop members 47, which are optional, one can predetermine the size of the loop 28 when in the trapping configuration. Thus, as arms 5 and 7 open and the snare loop size decreases, stop members 47 come into mutual contact with knot piece 48 to determine the loop size.

In operation, a probable site for trapping is selected and the trap so situated that the perimeter of knot 27 in the trapable configuration will be included in the animal's path. It is important to note that loop 28 as shown in FIG. 2 is beyond a line between the ends of arms 5 and 7. Moreover, the size of loop 28 is not limited by arms 5 and 7 or the distance between the ends thereof. Thus, in FIG. 2, loop 28 is far greater in circumference than the distance between the ends of arms 5 and 7. Further, it is to be ntoed that loop 28 is not limited to a configuration coplanar with the plane of the spring 1. In practice, this means that the spring 1 can be placed on top of a culvert, for example, with the loop 28 hanging down encircling the culvert opening. Similarly, the spring 1 can be laid on the ground and the loop 28 can be supported in a vertical position by a twig or the like which will not interfere with the springing of the trap. A further advantage of the trap of this invention is that when trip 31 is actuated and ring 29 disengages common transverse slot 43, arms 5 and 7 are able to and do move outwardly with respect to each other in a single plane. There is no necessity for an initial upward movement of the spring arms 5 and 7 before the outward movement closing the loop 28 occurs. Accordingly, the trap of this invention is extremely fast in operation.

Additional desirable features of the trap of this invention include the ability to adjust loop size by means of stops or the like. This is especially desirable since the trap can thus be designed to capture the animal only by a body hold which will not kill the animal. An animal so held not only will be captured alive but will not have the opportunity or the ability to chew off an ensnared limb.

Another feature of this invention which particularly aids in concealing the trap involves the shortening of one of the arms 5 and 7 of the trap with respect to the other arm. One arm being an inch or so shorter offsets the loop 28 so that the portion of the loop to the side of the longitudinal axis nearest the shorter arm is larger than the portion on the other side of the axis. For example, if arm 7 were shorter than arm 5 in FIG. 2, sleeves 21 and 23 would be slanted downward and to the right and loop 28 would be shifted to the right of its location as shown in FIG. 2. The purpose of having different length arms is to allow the trap to be located in relation to a runway so that the trap mechanism, except for the loop and a portion of trip member 31, is slightly to the side of the runway and only the loop or portion thereof and the trip member 31 or portion thereof is actually located in the runway.

It is to be appreciated that many changes and modifications will be apparent to those skilled in the art in view of the foregoing disclosure.

What is claimed is:

1. An animal trap comprising spring means having first and second arm members adapted to move from a loaded position to a sprung position in a substantially uniplanar direction, snare means operatively connected to said spring means, said snare means including a knot means adapted to assume a trapable configuration when said spring means is in said loaded position and a trapping configuration when said spring means is in said sprung position, said knot means in said trapable configuration being positionable substantially entirely beyond a line between the ends of said first and second arm members and further said knot means in said trapable configuration having a crosswise dimension with respect to the longitudinal axis of said spring means independent of the distance between the ends of said first and second arm members, locking means for releasably locking said spring means in said loaded position, said locking means comprising first means associated with said first arm and second means associated with said second arm, and latch means adapted to releasably engage said first and second means when said spring means is in said loaded position, and trip means operatively connected to said latch means, said trip means being adapted to be actuated by the animal when said snare means is in said trapable configuration whereby said latch means releases said first and second means allowing said first and second arm members to move in a substantially uniplanar direction to said sprung position.

2. The trap of claim 1 wherein said snare means comprises a single, flexible cable member.

3. The trap of claim 1 wherein said knot means has affixed thereto a pair of stop means adapted to determine the size of said knot means in said trapping configuration.

4. The trap of claim 1 wherein said first and second means of said locking means are fixedly attached at one end thereof to the ends of said first and second arm members, respectively.

5. The trap of claim 1 wherein said first and second means of said locking means comprise first and second tubular means, respectively, said first tubular means being fixedly attached to the end of said first arm member and said second tubular means being fixedly attached to the end of said second arm member, said first and second tubular means having a transverse slot, said first and second tubular means being adapted to communicate with each other when said first and second arms assume said loaded position such that said slots of said first and second means are in alignment to provide a latch slot, and said latch means is adapted to releasably engage said latch slot.

6. The trap of claim 5 wherein said latch means comprises an annular member and said trip means comprises an elongated member extending from said annular member, said trip means being sufficient in length to extend within the perimeter of said knot means when said knot means is in said trapable configuration.

7. The trap of claim 1 wherein said latch means comprises an annular member passing through said knot means.

8. The trap of claim 1 wherein said spring means further comprises a central coil portion from which said first and second arm members extend, said first and second arm members each comprising elongated body portions extending from said central coil portion and terminal portions normal to said body portions and said first and second means are fixedly attached at one end thereof to said terminal portions.

9. The trap of claim 1 wherein one of said first and second arm members is shorter than the other.

* * * * *